United States Patent [19]
Zhou et al.

[11] Patent Number: 5,831,845
[45] Date of Patent: Nov. 3, 1998

[54] VOLTAGE REGULATOR WITH CHARGE PUMP AND PARALLEL REFERENCE NODES

[75] Inventors: Shi-dong Zhou, Milpitas; Derek R. Curd, Fremont, both of Calif.

[73] Assignee: Xilinx, Inc., San Jose, Calif.

[21] Appl. No.: 52,819

[22] Filed: Mar. 31, 1998

[51] Int. Cl.$^6$ .................................................. H02M 3/18
[52] U.S. Cl. ............................................. 363/60; 363/62
[58] Field of Search ................................. 363/59, 60, 62; 307/109, 110; 320/166

[56] References Cited

U.S. PATENT DOCUMENTS 5,574,634  11/1996  Parlour et al. ............................. 363/59
5,592,370   1/1997  Rogers ....................................... 363/60

Primary Examiner—Peter S. Wong
Assistant Examiner—Y. S. Han
Attorney, Agent, or Firm—Edel M. Young; Adam H. Tachner

[57] ABSTRACT

A voltage regulator for a charge pump is provided with two input paths from a reference input voltage to a comparator, each path having a node between a capacitor pair. The two paths are alternately initialized and used to control the charge pump which generates a reference output voltage, so that the reference output voltage tracks the reference input voltage at all times. Each path has its own capacitor divider and switching circuitry to alternately connect the nodes between the respective pairs of capacitors to the comparator, which compares the nodes to a second voltage reference. Since the circuit is alternately initialized, any alterations to the voltage introduced at the nodes between each of the two capacitor pairs, are corrected to the proper level within a short time.

10 Claims, 1 Drawing Sheet

VOLTAGE REGULATOR WITH CHARGE PUMP AND PARALLEL REFERENCE NODES

FIELD OF THE INVENTION

The present invention relates generally to the field of voltage regulators, and in particular to voltage regulators utilizing a charge pump.

BACKGROUND OF THE INVENTION

Many ICs use nonvolatile memories, such as flash memories and $E_2$PROMs. For example, Complex Programmable Logic Devices (CPLDs) combine such memories with NMOS and PMOS circuitry. These memories require supply voltages of 12 volts and even 15 volts for programming and erase operations. In the past, a separate power supply, $V_{pp}$, and corresponding separate IC pin was used to provide these higher voltages. More recently charge pumps have been used to achieve voltages elevated above the supply voltage. Charge pumps are well known. A simple type of charge pump consists of a string of diode/capacitor stages in which the voltage at a node is elevated above the supply voltage $V_{cc}$ or lowered below ground voltage.

Charge pumps may be used to produce both positive and negative high-voltage supplies. Prior art voltage regulators for negative charge pumps use a pair of serially-connected capacitors, usually of different sizes, as explained in greater detail in connection with FIG. 1. Voltage regulators for positive charge pumps have used this structure also. In the embodiments described herein, the high voltage is a negative one. A first reference voltage is applied at a node between the two capacitors and a second reference voltage to a comparator, which controls the operation of the charge pump. The second reference voltage is slightly smaller than the first.

As long as there is a voltage difference between node A and $V_{ref2}$, comparator 16 enables negative charge pump 12, which in turn drives the voltage at node B more negative. This in turn drives the voltage at node A lower (i.e. toward $V_{ref2}$). Comparator 16 causes negative charge pump 12 to remain on until the voltage at node A reaches that of $V_{ref2}$. When this happens, comparator 16 changes state and shuts down charge pump 12.

A pass transistor 14 acts to selectively isolate node A from $V_{ref1}$. The capacitor bridge comprising capacitors C1 and C2 is refreshed from time to time by negative charge pump 12. A large capacitor C3 stabilizes the voltage at node B so that fluctuation of output voltage $V_{out}$ is minimized. But because node A between the two capacitors is isolated by pass transistor 14 once the voltage at node A has been initialized to the voltage at $V_{ref1}$, any voltage disturbance coupled to node A results in the comparator incorrectly re-establishing the high voltage output, usually to the wrong level.

SUMMARY OF THE INVENTION

It is therefore an object of the invention to provide a voltage regulator for a charge pump which provides better voltage regulation.

Another object of the invention is to provide a voltage regulator for a charge pump which is less susceptible to voltage disturbances.

In accordance with the invention, a voltage regulator for a charge pump is provided with two input paths from the larger of the two voltage references to the comparator in the voltage regulator described above. The two paths are alternately initialized and used to control a reference output voltage, so that the reference output voltage tracks the reference input voltage at all times. Each path has its own capacitor divider and switching circuitry to alternately connect the nodes between the respective pairs of capacitors with the comparator, which compares the nodes with the second voltage reference. Since the circuit is alternately initialized, any alterations to the voltage introduced at each of the nodes between the capacitor pairs are corrected to the proper level within a short time, so that a disturbance in the reference voltage does not affect output voltage $V_{out}$ for more than a very short time.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

DESCRIPTION OF THE PREFERRED EMBODIMENTS

Figure 1:
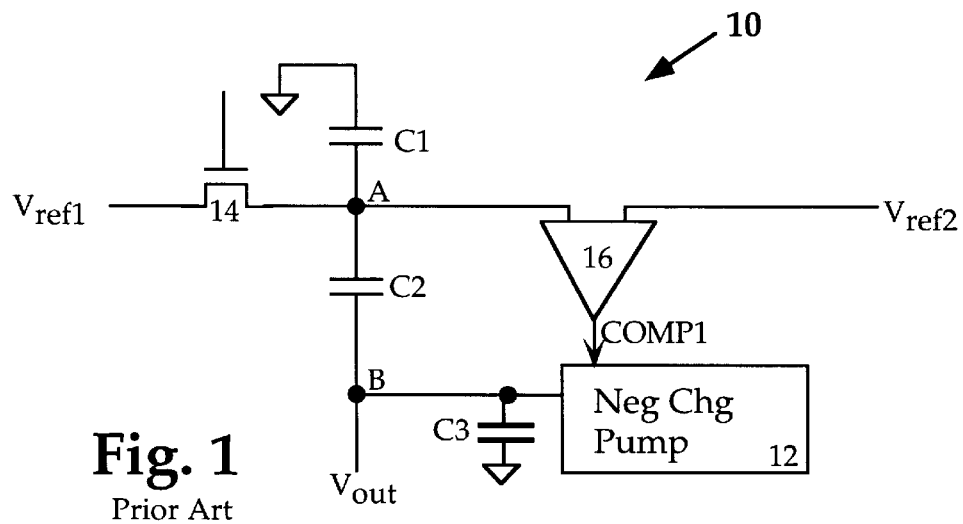
FIG. 1 is a schematic diagram of a prior art voltage regulator circuit.

FIG. 1 illustrates one prior art voltage regulator circuit 10 which uses a charge pump 12, in this case a negative charge pump. Charge pump 12 drives node B down towards a desired high voltage level, $V_{out}$. The regulator circuit maintains this desired (negative) high voltage level $V_{out}$ as follows. The output, $V_{ref1}$, of a standard high precision bandgap reference circuit (not shown) is switched to node A via a pass transistor 14. The output, $V_{ref2}$, of a second band gap reference circuit (not shown) is provided to a comparator circuit 16.

$V_{ref1}$ is selected to be somewhat higher than $V_{ref2}$. Initially, comparator 16 determines that Node A is at a higher voltage than $V_{ref2}$. For example, if $V_{ref1}$ is selected to be 2.0 volts and $V_{ref2}$ is selected to be 1.2 volts, the comparator 16 senses a voltage difference of 0.8 volts. As a result comparator 16 sends a signal, COMP1, to negative charge pump 12, indicating that the voltage at node A is greater than at $V_{ref2}$.

After node A is raised to $V_{ref1}$, pass transistor 14 is turned off so node A floats at or near the $V_{ref1}$ voltage, for example, 2.0 volts. This voltage difference between node A and $V_{ref2}$ causes comparator 16 to enable negative charge pump 12, thus pulling down node B. As the voltage at node B is pulled down by negative charge pump 12, the voltage at node A also drops. The two capacitors $C_1$ and $C_2$ act as a voltage divider. As the voltage at node B drops, the amount that the voltage drops at node A depends upon the relative sizes (capacitances) of capacitors $C_1$ and $C_2$. When the voltage of node A drops to the voltage of $V_{ref2}$, for example to 1.2 volts, the output COMP1 of comparator 16 changes state and turns off charge pump 12.

The size of capacitor $C_1$ is typically chosen to be larger than that of $C_2$. As a result, a relatively small voltage change at node A controls a larger voltage change at node B. More specifically, the relationship of the voltages at nodes A and B are given by the relationship:

Node A voltage×$(C_2+C_1)/C_2$=Node B voltage

So if it is desired that a change of 0.1 volt at node A results in a 1.0 volt change at node B, solving the above equation results in a ratio of $C_1+C_2$ to $C_2$ of 10. Capacitor C3 is much larger than either C1 or C2, and serves to maintain a stable reference voltage $V_{out}$ during operation.

There are several problems with the prior art voltage regulator 10 of FIG. 1. Comparator 16 operates to turn on the negative charge pump 12 until node B is at the desired voltage level. Once node B reaches the desired level, charge pump 12 is turned off and the pass transistor 14 is turned off, isolating node A.

But node B needs to be charged from time to time by charge pump 12. Between operations of charge pump 12 voltage disturbances can occur at node A. For example, ground noise can be coupled thru $C_1$ to Node A. Since node A is isolated by pass transistor 14 from $V_{ref1}$, any change in the node A voltage remains changed, and this sets a new node A "standard" with the effect of changing the output high voltage at node B.

Figure 2:
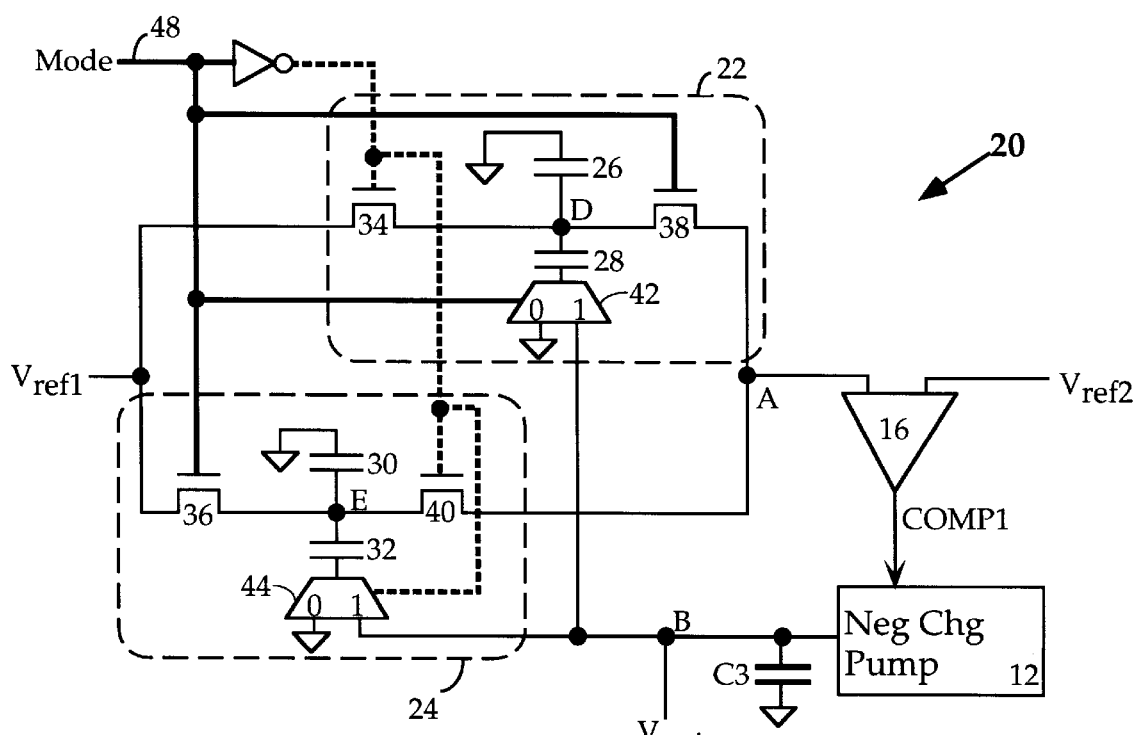
FIG. 2 is a schematic diagram of a voltage regulator circuit in accordance with the present invention.

FIG. 2 illustrates a voltage regulator 20 in accordance with the present invention. Where the elements of the voltage regulator are the same in FIG. 2 as in FIG. 1, like reference numerals are used. Two circuit paths 22 and 24 are shown. The first circuit path 22 includes a first capacitor divider which includes a first capacitor 26 and a second capacitor 28. As explained above, capacitor 26 is made larger than capacitor 28. The second circuit path 24 includes a second capacitor divider which includes a third capacitor 30 and a fourth capacitor 32, with capacitor 30 being larger than capacitor 32. The ratio of capacitors 26 to 28 and 30 to 32 are made to be identical. While one path is controlling comparator 16 and thus output voltage $V_{out}$ at node B, the other path is being initialized to the desired reference voltage. Switching occurs frequently so that $V_{out}$ is maintained very near a desired reference voltage.

A pair of pass transistor 34 and 36 alternately switch $V_{ref1}$ to nodes D and E respectively. Pass transistor 34 forms a part of the first circuit path and pass transistor 36 forms a part of the second circuit path. Another set of pass transistors 38 and 40 form a part of the first and second circuit paths, respectively. Transistors 38 and 40 alternately connect nodes D and E to the comparator 16.

Also forming a part of the first circuit path 24 is a first initializing switch 42. It alternately connects capacitor 28 to ground or to the negative charge pump 12. A second initializing switch 44 alternately connects capacitor 32 to ground or to negative charge pump 12.

A mode signal line 48 controls the operation of the voltage regulator 20. Initially, mode signal line 48 is low, so that node E controls voltage $V_{out}$ and node D is being initialized. In this mode, node A is connected to node E, and regulator circuit 24 operates identically with the regulator circuit 10 of FIG. 1. That is, comparator 16 compares the voltage at node E with $V_{ref2}$, and enables charge pump 12 until node B is brought down to the desired negative voltage. While mode signal line 48 is low, node D of circuit 22 is connected to reference voltage $V_{ref1}$ and both of capacitors 26 and 28 have their other plates connected to ground. This is the initial condition discussed above with respect to FIG. 1. Note that one plate of capacitor 26 is always connected to ground, and that one plate of capacitor 28 is selectively connected to ground by multiplexer 42. Thus the initial voltage difference between $V_{ref1}$ and ground is established across capacitors 26 and 28.

Then, when mode signal line 48 goes high, transistor 34 turns off and multiplexer 42 connects the lower plate of capacitor 28 to node B (or $V_{out}$). Transistor 38 turns on so that node D is connected to node A and thus controls negative charge pump 12 through comparator 16. Since capacitor C3 is much larger than capacitor 28, the lower plate of capacitor 28 shifts quickly to the approximate voltage at node B, causing a corresponding shift at node D, and thus node A. The voltage at node D thus controls charge pump 12. Thus it can be seen that circuit 22 operates as did prior art circuit 10 of FIG. 1 right after it was initialized. But unlike FIG. 1, circuit 20 of FIG. 2 switches state frequently so that each of circuits 22 and 24 are alternatively reinitialized and operational, and disturbances at nodes A, D, and E have only a transient effect on the voltage $V_{out}$ at node B.

Because capacitor C3 is large, node B will stay at the desired voltage as long as the cycle time between the two circuit paths is kept short enough. In one actual embodiment, the switching operation occurs every 100 microseconds. When, for example, mode line 48 is high, node D is connected to comparator 16 and capacitors 26 and 28 are controlling the high voltage output. While $V_{out}$ is being controlled by node D, circuit 24 is being reinitialized. What allows this to happen are the initializing switches 42 and 44. When, for example, capacitor 32 is being initialized, the lower plate of capacitor 32 is discharged to ground by initializing switch 44 and transistor 36 is turned on. Similarly, before capacitor 28 is to control the charge pump, it's lower plate is first discharged to ground by switch 42.

The advantage of the improved voltage regulator circuit 20 described above is that if a disturbance occurs at, for example, node D when it is controlling the output voltage, it doesn't control the output voltage for long. Node E will be switched on very quickly to regulate the output voltage and the disturbance at node D will be corrected. Node E is initialized to $V_{ref1}$, so that there is no adverse effect on the high voltage output. Similarly, if a voltage disturbance occurs at node E when it is controlled by the output voltage, node D will quickly be switched on to regulate the output voltage.

The more often the voltage regulator 20 is refreshed, the less likely a voltage disturbance will have an adverse effect on the high voltage output $V_{out}$. However, the speed at which the voltage regulator is refreshed is limited by the sizes of the capacitors and the available currents.

The voltage regulator of the present invention has been described using a negative charge pump to provide a negative output voltage. Of course, the invention is equally applicable for use with a positive output voltage and a positive charge pump. Additionally, other values for the reference voltages may be chosen within the scope of the present invention.

What is claimed is:

1. A voltage regulator comprising:

a first circuit path which includes a first pair of capacitors connected together, which connection defines a first node;

a second circuit path which includes a second pair of capacitors connected together, which connection defines a second node;

first and second reference voltages;

a charge pump alternately controlled by the first and second nodes;

a comparator circuit; and switching circuits for connecting the comparator circuit from the second reference voltage alternately to the first node and the second node, and wherein the comparator circuit enables the charge pump whenever the comparator senses a voltage difference.

2. A voltage regulator as in claim 1 wherein the charge pump provides a negative charge.

3. A voltage regulator as in claim 1 wherein the first reference voltage is larger than the second reference voltage.

4. A voltage regulator as in claim 1 wherein each capacitor pair includes one capacitor which is larger than the other and wherein the charge pump is alternately connected to the smaller of the two capacitors in each pair.

5. A voltage regulator as in claim 1 including means for initializing the first and second nodes before the first and second capacitor pairs are connected to the charge pump.

6. A voltage regulator comprising:
- a first voltage reference $V_{ref1}$;
- a second voltage reference $V_{ref2}$:
- a first capacitor voltage divider having a first capacitor and a second capacitor with the connection between the two defining a first low voltage node;
- a second capacitor voltage divider having a third capacitor and a fourth capacitor with the connection between the two defining a second low voltage node;
- a first pair of switches for alternately switching the first reference voltage $V_{ref1}$, between the first and second low voltage nodes;
- a charge pump circuit for alternately charging the second and fourth capacitors;
- a comparator circuit for enabling the charge pump circuit having one terminal connected to the second voltage reference $V_{ref2}$ and having a second terminal;
- a second pair of switches for connecting the first low voltage node to the second terminal of the comparator when the first low voltage node is connected to $V_{ref1}$ and for connecting the second low voltage node to the second terminal of the comparator when the first low voltage node is connected to $V_{ref1}$; and
- a first initializing switch for discharging the second capacitor when the second low voltage node is connected to the comparator and for discharging the fourth capacitor when the first low voltage node is connected to the comparator.

7. A voltage regulator as in claim 6 wherein the first capacitor is larger than the second capacitor and the third capacitor is larger than the fourth capacitor.

8. A voltage regulator as in claim 6 wherein the ratio of the first and second capacitors is equal to the ratio of the third and fourth capacitors.

9. A voltage regulator as in claim 6 wherein the charge pump provides a negative charge.

10. A voltage regulator comprising:
- two circuit paths for providing a first reference voltage to alternative nodes between two pairs of capacitors;
- a voltage comparator for alternately comparing a second voltage reference with a voltage on the alternative nodes; and
- a charge pump, enabled whenever the comparator senses a voltage difference, for alternately charging the capacitor pairs.

* * * * *